United States Patent [19]
Luthier et al.

[11] Patent Number: 5,834,876
[45] Date of Patent: Nov. 10, 1998

[54] METHOD AND CIRCUIT FOR EXCITING AND MONITORING A PIEZOELECTRIC MOTOR IN STEPPING MODE

[75] Inventors: Roland Luthier, Villars-sous-Yens; Fridolin Wiget, Neuchâtel, both of Switzerland

[73] Assignee: Asulab S.A., Bienne, Switzerland

[21] Appl. No.: 744,145

[22] Filed: Nov. 12, 1996

[30]       Foreign Application Priority Data

Nov. 16, 1995  [FR]  France ................................. 95 13607

[51] Int. Cl.⁶ ......................................................... H01L 41/08
[52] U.S. Cl. ............................................. 310/316; 318/116
[58] Field of Search ................................ 310/316, 317, 310/319; 318/116

[56]             References Cited
             U.S. PATENT DOCUMENTS

| | | | |
|---|---|---|---|
| 4,998,048 | 3/1991 | Furutsu | 318/116 |
| 5,198,732 | 3/1993 | Morimoto | 318/116 |
| 5,214,339 | 5/1993 | Naito | 310/316 |
| 5,479,063 | 12/1995 | Suganuma | 310/316 |
| 5,493,163 | 2/1996 | Nishikawa | 310/316 |
| 5,495,152 | 2/1996 | Fukui | 318/116 |
| 5,661,359 | 8/1997 | Katsuragawa | 310/316 |

*Primary Examiner*—Mark O. Budd
*Attorney, Agent, or Firm*—Sughrue, Mion, Zinn, Macpeak & Seas, PLLC

[57]                ABSTRACT

The invention concerns a method for exciting and monitoring a piezoelectric motor (M1) in stepping mode, the motor having a resonance frequency ($f_R$) and being supplied electrically at an excitation frequency ($f_E$) during each operating step.

The method is characterized in that it comprises a monitoring phase which extends at least over several successive steps of said motor and in which, for a present step of said motor, a determined excitation frequency value ($f_E+1$) is used, the duration ($t_E+1$) of the present step is measured, said duration ($t_E+1$) is compared to the duration ($t_E$) of the preceding step and, according to the result of this comparison, said excitation frequency value ($f_E+2$) is corrected for the following step in a direction tending to reduce the duration of the step.

A circuit is also described which enables the implementation of the method.

10 Claims, 5 Drawing Sheets

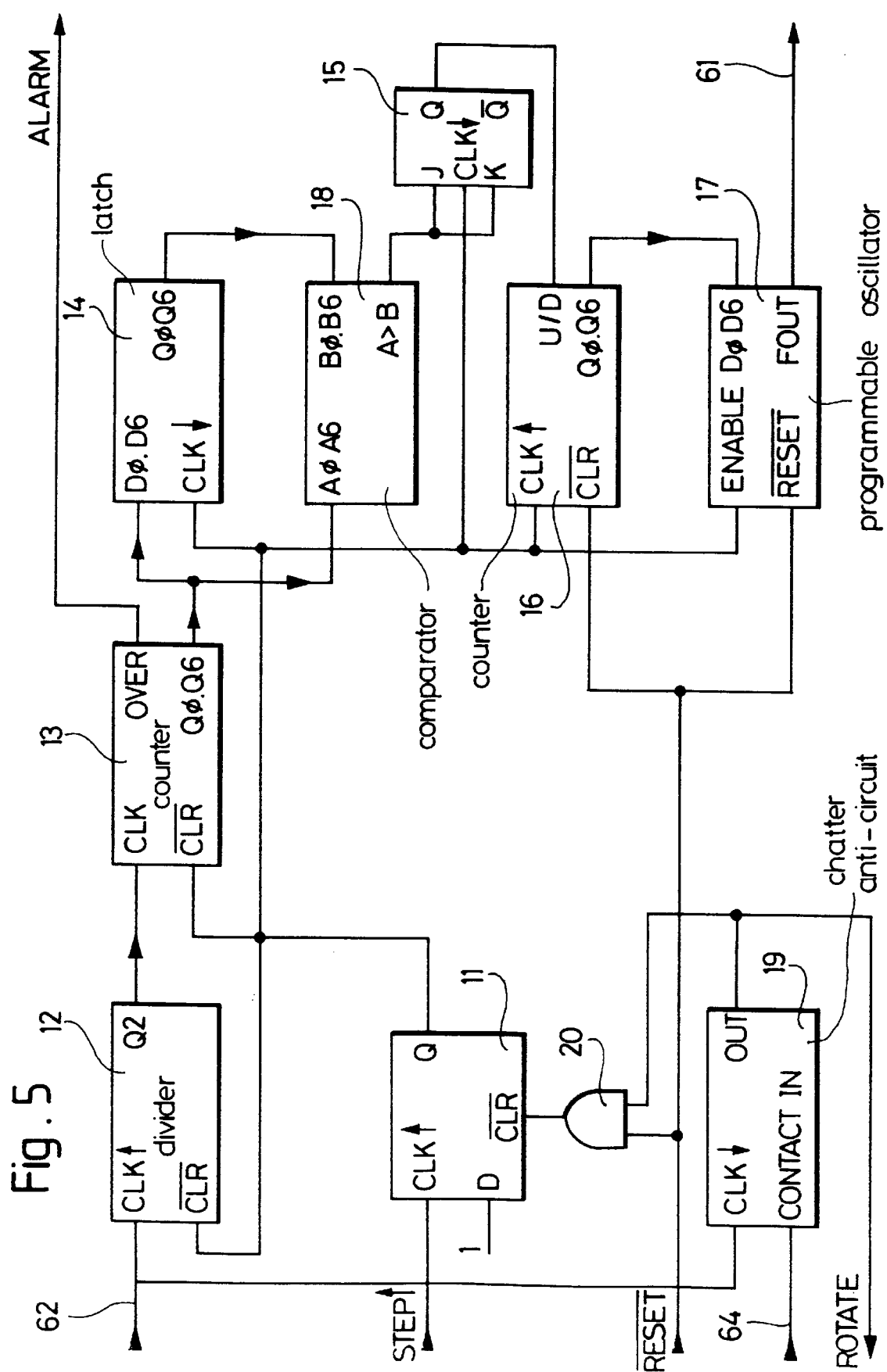

METHOD AND CIRCUIT FOR EXCITING AND MONITORING A PIEZOELECTRIC MOTOR IN STEPPING MODE

BACKGROUND OF THE INVENTION

The present invention concerns a method and circuit for exciting and monitoring a piezoelectric motor. More particularly, this invention concerns a method and circuit for exciting and monitoring a piezoelectric motor in stepping mode in order to stabilise the resonance excitation frequency of the motor. Such a motor may be used for example in a timepiece.

Generally, a piezoelectric motor comprises a rotor rotatably mounted on a stator forming a supporting structure assuring the axial support and guiding in rotation of the rotor, see for example patent document EPA-0 580 049. The piezoelectric motor operates at the resonance frequency $f_R$ of the stator. An excitation circuit applies an excitation frequency $f_E$, equal to the resonance frequency, to the stator. However, these frequencies vary with ambient conditions such as the temperature and with age, i.e. the wear and tear of the motor, but they do not vary in the same manner. Indeed, the effect of temperature on the circuit, and thus on the excitation frequency, is greater than the effect on the stator, and thus on the resonance frequency. If the variation between these two frequencies becomes too significant, the operation of the motor will deteriorate until the motor stops. This is why excitation frequency $f_E$ of the alternating signal applied to the motor must be monitored in order to assure that this excitation frequency $f_E$ remains equal to the resonance frequency $f_R$ of the motor.

Motor resonance frequency monitoring systems which use a closed loop control circuit for continually stabilising the excitation frequency are known. It generally concerns a PLL (Phase Locked Loop) system for maintaining constant the phase shift between the voltage and the current which are applied to the motor. These monitoring systems necessitate a phase detector and a voltage-controlled oscillator. However, it is understood that with these components, such a monitoring circuit becomes complex and expensive.

Another solution is known from patent document EP-A-0 366 496 which describes a piezoelectric motor monitoring circuit, said circuit comprising a voltage comparator, instead of a phase detector, and a voltage-controlled oscillator. However, here also the circuit, because of the components used, is expensive and complex. Furthermore, the systems of the prior art use analog magnitudes for monitoring the excitation frequency, which makes them more delicate.

The monitoring circuits and the methods of the aforementioned prior art are complex because they have to adjust the excitation frequency very precisely and continuously to assure that this latter remains identical to the resonance frequency necessary to make the motor rotate. For the application foreseen by this invention, i.e. in which the motor rotates in stepping mode, the circuits of the prior art are in fact too sophisticated and thus too expensive. Given that a motor in stepping mode does not rotate continually, it is not necessary to adjust its excitation frequency continually.

SUMMARY OF THE INVENTION

An aim of the present invention is to provide a solution to the aforementioned problems of the prior art by providing a method and a circuit for exciting and monitoring the excitation frequency for adjusting this latter around the resonance frequency, the method being simple and efficient, and the circuit being inexpensive and easy to make.

This aim is achieved as a result of a method for exciting and monitoring a piezoelectric motor in stepping mode, the motor having a resonance frequency and being electrically supplied at an excitation frequency during each operating step, the method being characterized in that it comprises a monitoring phase which extends at least over several successive steps of said motor and wherein, for a present step of said motor, a determined value of the excitation frequency is used, the duration of the present step is measured, said duration is compared to the duration of the preceding step and, according to the result of such comparison, said excitation frequency value is corrected for the following step in a direction tending to reduce the duration of the step, and as a result of an excitation and monitoring circuit of a piezoelectric motor in stepping mode comprising:

a programmable oscillator arranged to supply an adjustable frequency signal to a motor supply circuit;

means for measuring and storing the duration of a step of the motor;

means for comparing said duration with the duration of a preceding step and/or with a predetermined limit duration, and adjusting means acting on the programmable oscillator in response to said comparing means, to modify said adjustable frequency signal.

In an advantageous manner, the method and the circuit according to the invention allow stabilisation of the excitation frequency by means of digital signals. Moreover, the method and the circuit according to the invention allow advantage to be taken of the intrinsically simple construction of the stepping motor itself.

The method and the circuit according to the invention are used to monitor a motor which does not rotate continually, but which rotates, preferably, one step or several steps at a time and which thus waits for an external command before effecting the next step, such step being able to be a complete rotation or a fraction of a rotation. For example, if this motor is used in an electronic timepiece for driving the second hand, the oscillator is controlled by the clock circuit, and the motor rotates through one step each second. The motor rotates correctly at its resonance frequency $f_R$. Each time that the motor makes a step, the duration t required for effecting such step is measured. In order for the motor to operate properly, a duration to corresponding to a limit duration is determined and indicates the correct operating limit. Measured duration t is compared to this limit value $t_o$. If duration t exceeds duration $t_o$, one knows that the excitation frequency $f_E$ no longer corresponds to resonance frequency $f_R$, and that it must be adjusted. Since the influence of ambient conditions such as the temperature only changes resonance frequency $f_R$ of the motor slowly, it is sufficient to seek a new motor excitation frequency $f_E$ close to the former one and then to measure whether the motor rotates within limit duration $t_o$ at this new frequency. Thus, through slow convergence of frequency $f_E$ towards resonance frequency $f_R$, one manages to monitor the frequency of the motor oscillator sufficiently precisely for the motor to operate properly.

An embodiment of the subject of the invention will now be described hereinbelow, solely by way of example, with reference to the attached drawings, in which:

BRIEF DESCRIPTION OF THE DRAWINGS

FIG. 5 shows schematically an example of the excitation and monitoring circuit according to the invention.

DESCRIPTION OF A PREFERRED EMBODIMENT

Figure 1:
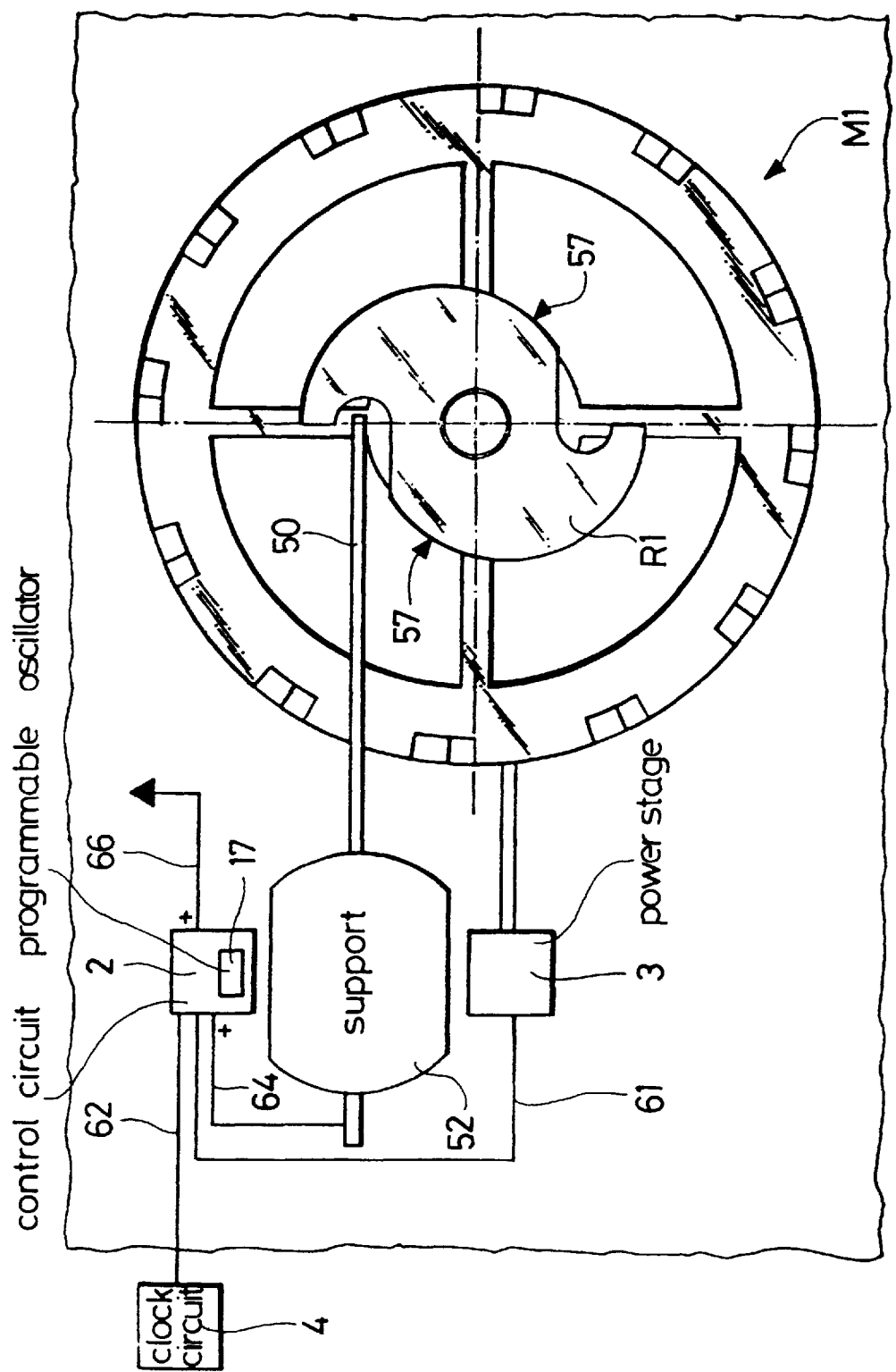
FIG. 1 shows schematically a piezoelectric motor and its control means able to be monitored by the monitoring method and circuit according to the invention.

FIG. 1 shows schematically a piezoelectric motor and its control means, such motor being able to be excited and monitored by the excitation and monitoring circuit according to the invention.

The piezoelectric motor M1 comprises a rotor R1 rotatably mounted on a stator S1 (not shown in FIG. 1) forming a supporting structure assuring the axial support and guiding in rotation of the rotor. Piezoelectric motor M1 operates at resonance frequency $f_R$ of the stator, which is thus excited to resonance corresponding to a symmetrical vibratory motion with respect to the axis of the disc of stator S1. A control circuit 2 of the motor supplies an alternating frequency signal corresponding to the desired excitation frequency $f_E$. For this purpose, control circuit 2 comprises a programmable oscillator 17 arranged to provide the desired frequency $f_E$. It concerns here an RC oscillator coupled to a quartz providing the reference frequency. Oscillator 17 is switchable, i.e. it can be switched on or off by control circuit 2. The output of oscillator 17 drives directly or via an electric line 61 and a power stage 3, the piezoelectric elements of the motor to cause stator S1 to vibrate and to drive rotor R1 in rotation.

Angular positioning means (50, 57) are provided allowing the rotating movement of rotor R1 to be stopped, for example in two predetermined angular positions, staggered at 180°. Such a construction has been described in more detail in patent document EP-A-0 587 031 to which the reader can refer for more details.

The positioning means comprise in this example an contact spring leaf 50 which is mounted on a support 52 and arranged in the plane of rotation of rotor R1 and which is shaped to come into lateral contact on the external periphery 57 of the latter, at least during part of its rotation. Periphery 57 of rotor R1 has a cam profile for this purpose, as is explained in more detail in aforecited patent document EP-A-0 587 031. Spring leaf 50, which is made of an electrically conductive material, forms with rotor R1 an electromechanical switch which is associated with control circuit 2 via an electric line 64. A second electric line 66 connects circuit 2 to earth, as has been explained in aforecited patent document EP-A-0 587 031. One step of the motor is defined here by the end of the step, thus at the moment of reopening the contact. It is also to be noted that control circuit 2 is connected to a clock circuit 4 supplying it with pulses at a certain frequency via a line 62.

In order to assure proper operation of the motor, it is thus necessary for such motor to be excited around its resonance frequency $f_R$. Since frequency $f_R$ varies under the influence of thermal effects and because of the ageing of the motor, it is necessary to monitor excitation frequency $f_E$ produced by oscillator 17.

Figure 2:
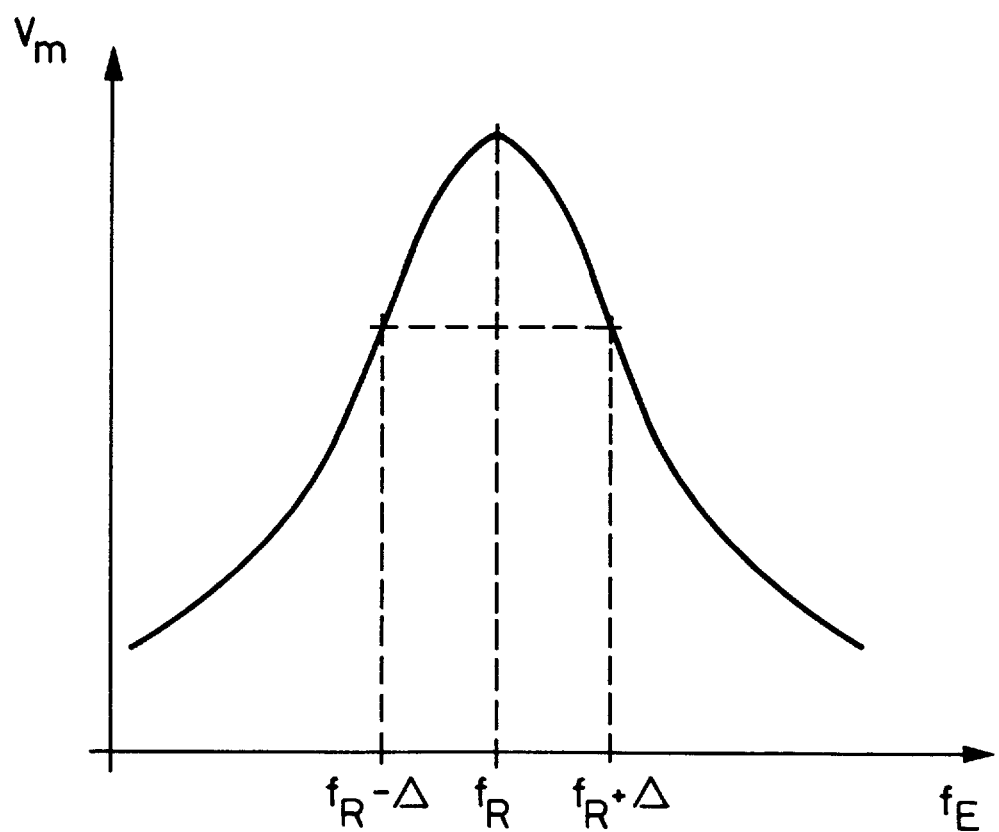
FIG. 2 shows schematically the rotational speed of the motor with respect to the frequency applied to the motor.

FIG. 2 shows the speed of rotation $V_m$ of the motor with respect to excitation frequency $f_E$ applied to the motor. The optimum frequency, which gives rapid rotation, is at resonance frequency $f_R$ of the motor.

For this purpose, control circuit 2 first measures the duration of a step of the motor at frequency $f_E$ with the aid of the aforementioned spring leaf/rotor electromechanical switch 50, R1. For the motor to rotate correctly at frequency $f_R$, each time that the motor makes a step, duration $t_i$ required for making such step must remain within a predetermined limit duration $t_o$ which is still considered acceptable. If measured duration $t_i$ exceeds duration $t_o$, one knows that excitation frequency $f_E$ applied by oscillator 17 to the motor no longer corresponds exactly to frequency $f_R$ and that frequency $f_E$ must thus be modified. Since the influence of ambient conditions, such as the temperature, only changes slowly motor resonance frequency $f_R$, and thus the rotational speed of the motor, it is sufficient to seek a new excitation frequency $f_E$ close to the former one, for example $f_E+\Delta f$, to then measure the new duration $t_i+1$ of one step effected by the motor at this new frequency $f_E+\Delta f$. If duration $t_i+1$ still exceeds limit duration $t_o$, a new excitation frequency $f_E$ is sought in the opposite direction i.e. $f_E-\Delta f$. Thus, through slow convergence, one manages to adjust frequency $f_E$ applied by oscillator 17 to the motor in a sufficiently precise manner for the motor to operate properly and thus rotate within its limit duration $t_o$.

The operating tolerance of the motor defines a range of frequencies, from $f_R-\Delta$ to $f_R+\Delta$ (see FIG. 2). If for example resonance frequency $f_R$ imposed by manufacturing is 130 kHz, and the tolerance of the motor $\Delta$ is for example ±10 kHz, the range within which the motor may still operate is thus 20 kHz, i.e. from 120 to 140 kHz. The resonance frequency of the motor then determines the operating frequency range of oscillator 17. Since the frequency of the motor varies slightly, an operating range of oscillator 17 must be determined around the motor frequency range taking account of a certain safety margin due to the manufacturing tolerance of the motor. This operating range of oscillator 17, which is thus broader than operating range $\Delta$ and which has been discovered by experiment, is chosen in this example to be between 100 and 163.5 kHz. Thus, the oscillator tolerance $\delta$ can be defined as being ±31.75 kHz.

The excitation and monitoring method and circuit according to the invention are designed so as first to seek rapidly an excitation frequency $f_E$ at which the motor can operate, i.e. at which the motor rotates within its limit duration $t_o$, to then monitor this frequency $f_E$ in order continually to assure proper operation, by adjusting frequency $f_E$ applied to the motor when this becomes necessary, i.e. when frequency $f_E$ is too far from resonance frequency $f_R$ of the motor indicated by measured duration t exceeding limit duration $t_o$. In simpler terms, the method and the circuit according to the invention try to remain close to the peak of the curve shown in FIG. 2 by modifying excitation frequency $f_E$, preferably in an iterative manner. In an advantageous manner, the excitation and monitoring circuit according to the invention forms part of control circuit 2.

The method and the operation of the circuit will be explained hereinafter with the aid of the schematic flow charts of FIGS. 3 and 4.

Figure 3:
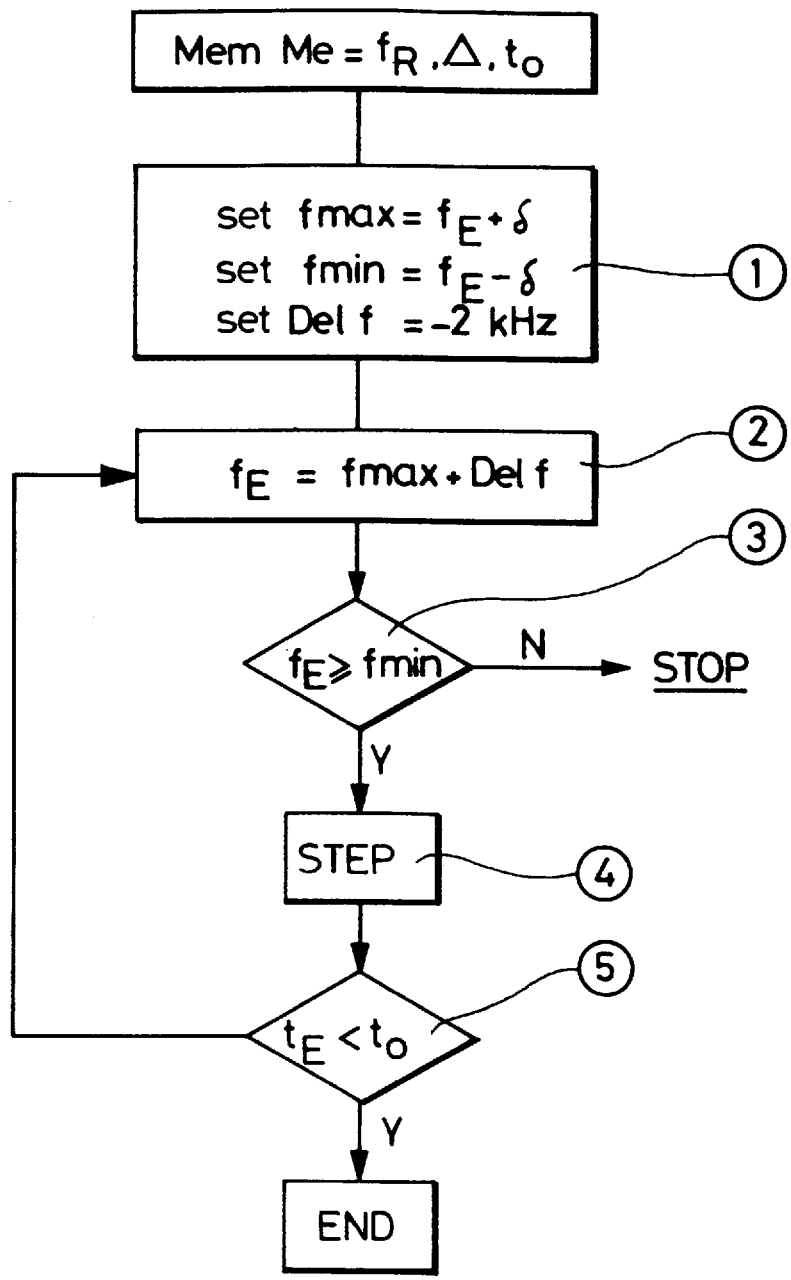
FIG. 3 is a flow chart showing schematically the various steps of the initialisation phase by the method and the circuit according to the invention.

FIG. 3 is a flow chart showing schematically the initialisation phase by the circuit according to the invention. Firstly, in step 1, the initialisation parameters are read from a memory Me, which can be incorporated in circuit 2, to control circuit 2 which controls programmable oscillator 17. As has been explained hereinbefore, these parameters depend upon the motor manufacturing and thus comprise resonance frequency $f_R$ and tolerance value $\Delta$.

Next, a maximum frequency fmax of oscillator 17 can be determined which is equal to $f_E+\delta$, in which $\delta$ corresponds to the operating range of oscillator 17, as has been explained hereinbefore. Frequency $f_E$ corresponds to the nominal resonance frequency $f_R$ of the motor, thus to 130 kHz. Likewise, a minimum frequency fmin can be determined which is equal to $f_E-\delta$. Frequency fmax is fixed in step 1 in FIG. 3.

Means (15, 16 see FIG. 5) for adjusting the frequency of oscillator 17 are arranged for fixing a frequency changing parameter in the event that the motor does not rotate. This parameter is referenced here Delf and is selected in advance, for example, at −2 kHz. This parameter defines the initial convergence for finding a frequency at which the motor can operate in a sufficiently efficient manner.

The flow chart also shows the steps to be taken by the method and the circuit according to the invention to make the motor operate. The sign N represents "no" and the sign Y represents "yes" in response to a test step.

In step 2, oscillator 17 is set into operation at frequency $f_E$=fmax+Delf, in this example $f_E$=163.5−2=161.5 kHz. Then, in step 3, this frequency $f_E$ is compared to frequency fmin to ensure that it does not depart from the manufacturing defined operating range of the motor. If frequency $f_E$ is smaller than fmin, the motor is stopped, which is represented by "STOP", and one knows that the motor is not working. In such a case, an alarm signal, represented by "ALARM" in FIG. 5, may be given to indicate that the motor has a defect.

If frequency $f_E$ is equal to or greater than frequency fmin, a command to rotate the motor through one step is given, i.e. oscillator 17 is turned on to cause the motor to rotate, which is represented by step 4 called "STEP" in FIG. 3. Duration $t_E$ for executing this step by the motor is measured in step 5. If duration $t_E$ is greater than limit duration $t_o$, the next frequency $f_E+1=f_E+$ Delf is determined, in step 2, and prescribed for oscillator 17. Then, steps 3 to 5 are repeated at the new frequency. If, on the other hand, measured duration $t_E$ is equal to or less than limit duration $t_o$, one knows that the motor is operating properly. The initialisation phase is thus ended, which is indicated by "END" in FIG. 3. This initialisation phase is preferably effected each time that the excitation and monitoring circuit is set into operation, for example when it begins to receive an electric supply voltage.

After this initialisation phase, which is in fact a rough adjustment of excitation frequency fE of oscillator 17 to make the motor rotate, the monitoring phase is executed to assure continually proper operation despite the influence of ambient conditions which changes resonance frequency $f_R$ of the motor, in order to correct excitation frequency $f_E$ of oscillator 17.

Figure 4:
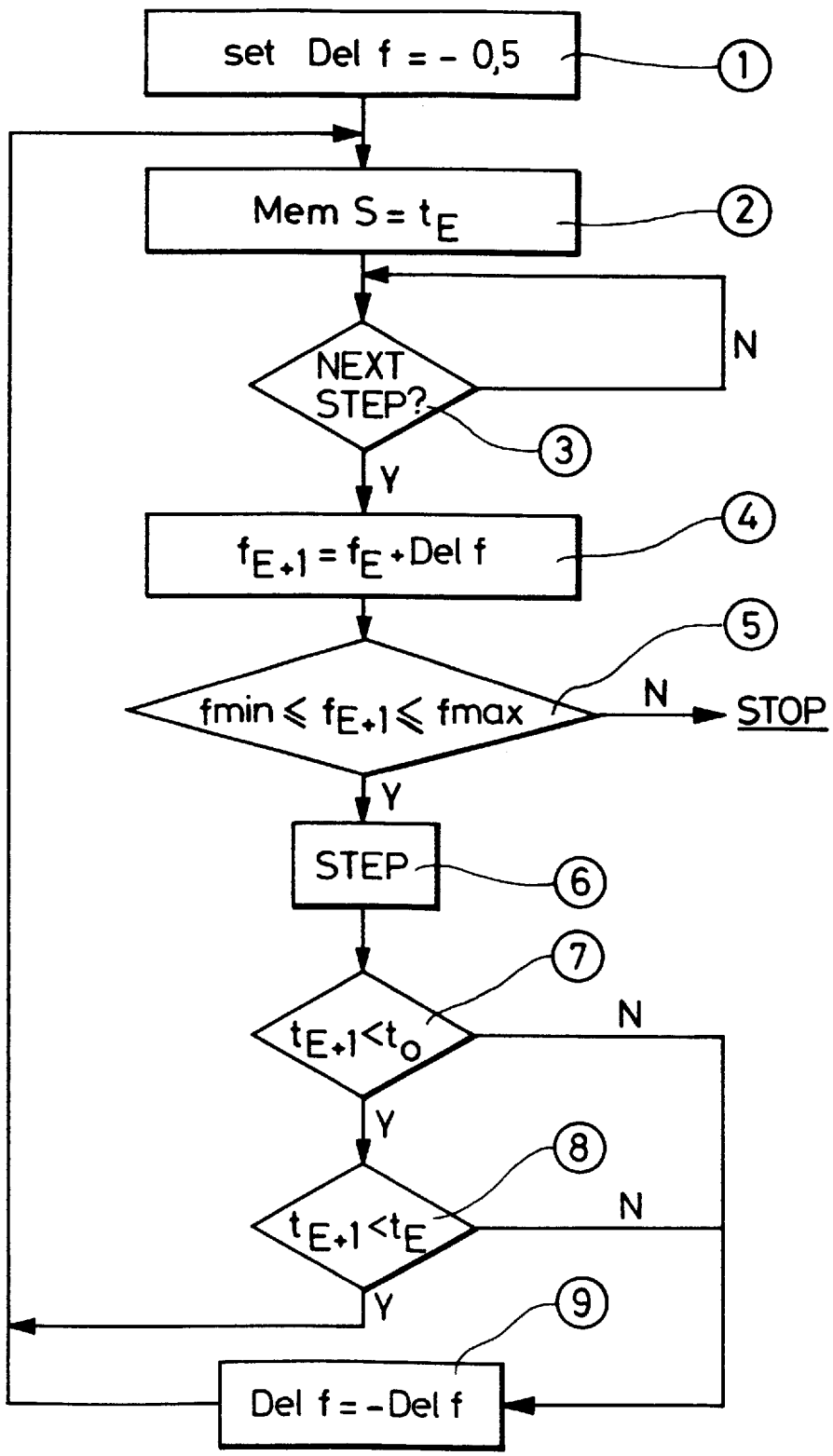
FIG. 4 is a flow chart showing schematically the various steps of the monitoring phase of the method and the circuit according to the invention.

A flow chart which shows schematically the steps to be executed by the method and the circuit according to the invention in order to perform this fine adjustment is shown in FIG. 4.

First, in step 1, parameter Delf is modified so that it is chosen to be smaller, here −0.5 kHz, to obtain a finer adjustment of the frequency. Duration $t_E$ of the first step, measured during initialisation, is stored in a memory S in step 2. Memory S may be for example a latch register, referenced 14 in FIG. 5 as will be explained in more detail hereinafter. Since it concerns here a motor which rotates through one step at a time, oscillator 17 thus waits for an external command before being turned on to produce the next rotational step of the motor, see step 3. As soon as this external command is received, the frequency of oscillator 17 is changed from its initial frequency $f_E$ to the new frequency $f_E+1=f_E+$ Delf, see step 4. Then, in step 5, new frequency $f_E+1$ is compared to frequency fmax and to frequency fmin to check that it does not depart from the operating range of the motor. If it has departed from the range, thus if the condition in step 5 is not fulfilled —which is indicated by the reference "IN"—the monitoring phase is stopped, indicated in step 4 by the word "STOP", in order to reset oscillator 17 at its excitation frequency $f_E$ during the initialisation phase described hereinbefore with the aid of FIG. 3. If it is still within the range, oscillator 17 is turned on at this new frequency $f_E+1$, and the motor is turned on to effect a step, see step 6. The duration of this step is measured and this duration $t_E+1$, is compared to limit duration $t_o$, in step 7, to ensure that the motor is operating properly. If duration $t_E+1$ is greater than limit duration $t_o$, one passes to step 9 to invert the value of parameter Delf to seek the new frequency in the other direction, in the same manner as the operation of the circuit in its initialisation phase explained hereinbefore, and the steps described hereinbefore are repeated, but now with a change of excitation frequency $f_E+2$ in the other direction.

Conversely, if duration $t_E+1$ is smaller than $t_o$, one knows that the motor has rotated properly. Then, in step 8, duration $t_E+1$ is compared to previously measured duration $t_E$ to evaluate whether the motor operates more efficiently at the new frequency $f_E+1$. Thus, a continuous optimisation of the operation of the motor through convergence towards real resonance frequency $f_R$ may be achieved by the method and the circuit according to the invention.

FIG. 5 shows schematically an example of an excitation and monitoring circuit according to the invention for executing the fine adjustment explained hereinbefore with the aid of FIG. 4.

The circuit comprises a D type flip-flop 11 which receives at its clock input, referenced CLK, a control pulse signal "STEP" corresponding to step 6 of FIG. 4. This input reacts on the leading edge of the "STEP" signal. Input D is always at logic level "1", i.e. high. Output Q of D flip-flop 11 is connected to the $\overline{\text{CLR}}$ inputs of a divider 12, and of a seven bit counter 13. This output Q is also connected to the clock inputs, referenced CLK, of a latch register 14, which reacts on the trailing edge, of a JK flip-flop 15, which also reacts on the trailing edge, of an up-down counter 16, which reacts on the leading edge, and also to the validation input, referenced "ENABLE", of programmable oscillator 17. As has already been mentioned, flip-flop 15 and up-down counter 16 together form the adjusting means of excitation frequency $f_E$ of oscillator 17.

Counter 13 will measure and compare duration $t_E$ of the step to be effected at limit value $t_o$. Register 14 thus corresponds to memory S described in step 2 of FIG. 4. The new value of counter 13 which corresponds to duration $t_E+1$ then becomes former value $t_E$, see step 3 of FIG. 4. Divider 12 receives its pulses from clock circuit 4, via an electric line 62 (see FIG. 1), at clock input CLK with a frequency of 1024 Hz. Divider 12 operates as a divider by $2^3$ and gives a pulse signal at 128 Hz at its output Q2. This output is connected to clock input CLK of counter 13.

Counter 13 has a first output "OVER" which gives an alarm signal, referenced "ALARM" and corresponding to the "STOP" command of step 3 of FIG. 3, when the counter overflows, i.e. if duration $t_E$ required for making one step has exceeded predetermined limit value $t_o$. The other output, referenced Q0–Q6, of counter 13, which corresponds to the seven bit value of the counter and thus to the duration of one step, is connected to input D0–D6 of latch register 14, and also to input A0–A6 of a comparator 18. Output Q0–Q6 of register 14 is connected to a second input, referenced B0–B6, of comparator 18. Output A>B of comparator 18 gives the result of the comparison between the seven bit values provided by counter 13 and by register 14, corresponding to step 8 of FIG. 4. This output is connected to inputs J and K of JK flip-flop 15. Output Q of JK flip-flop circuit 15 is directly connected to input U/D of up-down counter 16. The value of the counter will thus be consequently incremented or decremented. Output Q0–Q6 of the up-down counter, which thus corresponds to the seven bit value, is connected to input D0–D6 of oscillator 17. Output Fout of oscillator 17 has frequency $f_E$ applied by the programmable oscillator to the motor. Thus, oscillator 17 can deliver an adjustable frequency.

D type flip-flop circuit 11 has another $\overline{CLR}$ input which receives an output signal from an "AND" gate 20 with two inputs. A first input of gate 20 receives a reset signal, referenced $\overline{RESET}$, controlled by an external controller. Reset signal $\overline{RESET}$ may also be provided to the reset inputs of up-down counter 16 and oscillator 17. The second input of gate 20 is connected to the "OUT" output of an anti-chatter circuit 19. Anti-chatter circuit 19 also receives at its clock input, referenced CLK, the clock signal at 1024 Hz which reacts through its trailing edge. This anti-chatter circuit 19 reacts on the contact made by the piezoelectric motor when the latter has effected a step. The contact pulse comes from the angular positioning means (50, 57) via electric line 64, as has been explained hereinbefore with the aid of FIG. 1. The "OUT" output of anti-chatter circuit 19 emits a brief negative pulse upon the opening of the motor rotation detection contact. This pulse interrupts the rotation of the motor by a control signal, referenced "ROTATE".

In short, it can be said that after resetting "RESET", by the external controller, the motor is turned on in order to effect a step. The "STEP" pulse will release divider 12 and counter 13. JK flip-flop 15 will increment or decrement up-down counter 16 according to the result of the comparison effected by comparator 18. Consequently, the frequency of oscillator 17 is determined and this latter is actuated to cause the motor to rotate by giving a pulse via electric line 61 (see also FIG. 1).

As a result of the excitation and monitoring method and circuit which have just been described, frequency $f_E$ of oscillator 17 is optimised in an iterative manner while remaining close to resonance frequency $f_R$ of the motor, so that the operation of the motor is very efficient. Although a preferred embodiment of the excitation and monitoring method and circuit according to the invention is described above, the invention is not limited to this specific embodiment, which is given solely by way of non-limiting example of the invention.

What is claimed is:

1. A method for exciting and monitoring a piezoelectric motor in stepping mode, the motor having a resonance frequency and being electrically supplied at an excitation frequency during each operating step, wherein the method comprises a monitoring phase which extends at least over several successive steps of said motor and wherein, for a present step of said motor, a determined value of the excitation frequency is used, the duration of the present step is measured, said duration is compared to the duration of the preceding step and, according to the result of such comparison, said excitation frequency value is corrected for the following step in a direction tending to reduce the duration of the step.

2. A method according to claim 1, wherein said correction consists of adding to said excitation frequency value a predetermined increment capable of being positive or negative.

3. A method according to claim 2, wherein if the comparison indicates that the duration of the present step is greater than that of the preceding step, the increment sign is changed.

4. A method according to claim 2, wherein a negative value is given to said increment if, for an initial step of the monitoring phase, said determined excitation frequency value is greater than the resonance frequency.

5. A method according to claim 1, wherein it comprises, prior to the monitoring phase, an initialisation phase which extends over several successive steps of the motor and wherein the determined excitation frequency value to be used is defined at the beginning of the monitoring phase.

6. A method according to claim 5, wherein in the initialisation phase, a range of excitation frequencies between two limit values is considered, a first of the excitation frequency limit values is used for producing a first step of the motor, the duration of this step is measured and, if it is less than a maximum limit duration one passes to the monitoring phase, if not the excitation frequency is corrected in the direction of the other limit value and the excitation frequency thus corrected is used for producing a second step of the motor, and so on until the duration of the step is less than said maximum limit duration.

7. An excitation and monitoring circuit of a piezoelectric motor in stepping mode suitable for implementation of the method according to claim 1, wherein said circuit comprises:

a programmable oscillator arranged to supply an adjustable frequency signal to a motor supply circuit;

means for measuring and storing the duration of a step of the motor;

means for comparing said duration to the duration of a preceding step and/or to a predetermined limit duration, and adjusting means acting on the programmable oscillator in response to said comparing means, to modify said adjustable frequency signal.

8. A circuit according to claim 7, wherein said adjusting means are arranged for modifying by incremention said adjustable frequency signal.

9. A circuit according to claim 7, wherein said measuring and storage means comprise a counter associated with a latch register.

10. A circuit according to claim 7, wherein the circuit also comprises means for controlling the operation of said measuring and storing means following the reception of a pulse generated by detecting means of the motor when this latter has effected a step.

* * * * *